US011402347B2

United States Patent
Shim et al.

(10) Patent No.: US 11,402,347 B2
(45) Date of Patent: Aug. 2, 2022

(54) GAS SENSOR WITH A CONFIGURABLE HEATING ELEMENT, AND METHODS EXPLOITING THE CONFIGURABILITY

(71) Applicant: ALPHA M.O.S, Toulouse (FR)

(72) Inventors: Chang Hyun Shim, Fourquevaux (FR); Sébastien Pelletier, Auzeville Tolosane (FR)

(73) Assignee: ALPHA M.O.S., Toulouse (FR)

( * ) Notice: Subject to any disclaimer, the term of this patent is extended or adjusted under 35 U.S.C. 154(b) by 734 days.

(21) Appl. No.: 16/375,173

(22) Filed: Apr. 4, 2019

(65) Prior Publication Data

US 2019/0310216 A1    Oct. 10, 2019

(30) Foreign Application Priority Data

Apr. 5, 2018 (EP) .................................. 18305404

(51) Int. Cl.
*G01N 27/12* (2006.01)
*H05B 3/20* (2006.01)

(52) U.S. Cl.
CPC ......... *G01N 27/123* (2013.01); *G01N 27/125* (2013.01); *H05B 3/20* (2013.01); *H05B 2203/003* (2013.01); *H05B 2203/037* (2013.01)

(58) Field of Classification Search
CPC ...... G01N 25/20; G01N 27/12; G01N 27/123; G01N 27/124; G01N 27/125; G01N 27/14; G01N 27/18; H05B 3/20; H05B 2203/003; H05B 2203/037
See application file for complete search history.

(56) References Cited

U.S. PATENT DOCUMENTS

| 4,953,387 A * | 9/1990 | Johnson ................. G01N 27/12 73/25.03 |
|---|---|---|
| 2002/0118027 A1 | 8/2002 | Routkevitch et al. |
| 2009/0217737 A1 | 9/2009 | Dorfmueller et al. |
| 2016/0238548 A1 | 8/2016 | Aguir et al. |

FOREIGN PATENT DOCUMENTS

| JP | 2014132241 A | 7/2014 |
|---|---|---|
| WO | 2006005332 A2 | 1/2006 |

OTHER PUBLICATIONS

Extended European Search Report from corresponding EP Application EP18305404.8, dated Jun. 29, 2018.

* cited by examiner

*Primary Examiner* — Benjamin R Schmitt
(74) *Attorney, Agent, or Firm* — Workman Nydegger

(57) ABSTRACT

In a gas sensor having a gas-sensitive layer and a heating element to heat the gas-sensitive layer, the heating element comprises a heater track having first and second outer electric terminals and at least one inner electric terminal located between the outer electric terminals. The gas sensor includes a control unit configured to control the electric potentials that are applied to the electric terminals during use, and the control unit is configured to be capable of varying the set of electric potentials applied to the electric terminals. In certain applications the control unit may select the terminals to which power is applied, in order to assure the gas-sensitive layer is heated to a specified temperature. In certain applications the gas sensor has multiple measurement electrodes and the control unit selects the set of electric potentials so that different temperatures are attained at locations where different measurement electrodes are located.

14 Claims, 8 Drawing Sheets

GAS SENSOR WITH A CONFIGURABLE HEATING ELEMENT, AND METHODS EXPLOITING THE CONFIGURABILITY

FIELD OF THE INVENTION

The present invention relates to the field of gas sensors and, more particularly, to gas sensors that incorporate a heating element.

BACKGROUND OF THE INVENTION

Gas sensors are used in many applications, notably in situations where it is desired to detect or recognise a particular gas and in situations where it is desired to determine the composition of a gas mixture. In the present text, unless the context demands otherwise: the expression "gas" will be used to designate both a specific gas species and a mixture of different gaseous species, and the general expression "characterisation" will be used to designate both the process of recognizing or detecting a particular gas and the process of determining the composition of a gas. It is to be understood that references in this text to a "gas sample" generally include references to any gas which is presented to the gas sensor (whether as a discrete sample or by exposing the sensor to an ambient gaseous medium).

Gas sensors have been developed using different sensing technologies, including chemoresistor type gas sensors, gas sensors based on solid electrolytes, and so on. Chemoresistor gas sensors often use semi-conducting metal-oxides as a gas-sensitive material. FIG. 1 is a cross-sectional view which illustrates, schematically, the basic structure of a typical semi-conducting metal-oxide type gas sensor 1.

As shown in FIG. 1, a semi-conducting metal-oxide type gas sensor 1 has a gas-sensitive layer 2 made of semi-conducting metal-oxide provided on an insulating supporter 3. When the sensor 1 is exposed to a gas, gas particles G may become adsorbed on the surface of the gas-sensitive layer 2, and oxidation-reduction reactions may occur, leading to a change in the impedance (conductance, capacitance, inductance or plural of these parameters) of the gas-sensitive layer 2. This change in the electrical characteristics of the gas-sensitive layer can be detected using measuring electrodes 5 provided in contact with the gas-sensitive layer 2. Often the measurement is made by applying a potential difference across the measurement electrodes and monitoring how the impedance presented by the gas-sensitive layer changes. The waveform of the signal produced by the measuring electrodes is characteristic of the gas reacting with the gas-sensitive layer 2 and, typically, the waveforms produced by gases of interest are learned during a teaching phase preparatory to analysis of unknown gas samples.

In general, it is necessary to heat the gas-sensitive layer 2 to a relatively high temperature (notably 350° C. or above depending on the material forming the sensing layer and the gas species to be detected) in order for useful adsorption phenomena to be observed. Accordingly, typical gas sensors of this type also include a heating element including a heater track 6 on the opposite side of the insulating supporter 3 to the side for the gas sensitive layer 2 through which electrical current is passed in order to heat up the gas-sensitive layer 2. Gas sensors may also include a temperature sensor for monitoring and/or feedback purposes. After a measurement has been taken the heating element is activated by causing greater current to pass through the heater track 6 to heat the active layer to a high temperature, above the usual operating temperature, so as to cause de-sorption of adsorbed particles, thus cleaning the sensor 1 ready for a subsequent measurement.

An aim in this field is to be able to construct micro-sensors, that is, miniaturized gas sensors particularly those that are small enough to be integrated into everyday appliances (for example, mobile telephones, face masks, intelligent toys, etc). It is a requirement for micro-sensors that they should have sufficiently high performance, that is, they should be able to detect a target gas, and/or determine a composition of a gas mixture, rapidly and with a sufficiently high degree of accuracy.

Semi-conducting metal-oxide gas sensors attract particular interest for implementation as micro-sensors because they can be built in miniaturized form using techniques known from the field of integrated circuit manufacture.

In recent years semi-conducting metal-oxide type gas sensors having a "micro-hotplate" structure have been developed. FIG. 2A is a cross-sectional view which illustrates, schematically, the general structure of a semi-conducting metal-oxide type gas sensor 10 having a micro-hotplate structure. It will be seen from FIG. 2A that the base 14 of the sensor 10 has a hollowed-out portion 17 so that the sensing layer 12 is no longer positioned in registration with a thick portion of the base 14. Accordingly, the heater track 16 which is used to heat the sensing layer 12 only needs to heat a reduced mass of material (including a relatively thin supporting membrane M), which reduces the power consumed by the gas sensor as well as enabling the temperature of the sensing layer 2 to be increased rapidly (thus reducing the time necessary for making a measurement and reduces the time necessary for cleaning the sensing layer).

FIGS. 2B and 2C illustrate sensors having two different types of micro-hotplate architectures.

In the sensor 20 of FIG. 2B, the sensing layer 22 is formed on an insulating layer 23 which, in its turn, overlies the base 24. Conductors 26 lead out from the measuring electrodes and conductors 28 lead out from the heater track to make contact with electrode pads 27 and 29, respectively, provided on the base 24. Additional wiring (not shown) connects the electrode pads to further circuitry, notably a source of current/power for the heater track, and circuitry for processing the signals measured by the measurement electrodes. The sensor 20 of FIG. 2B has a "closed" type of architecture in which the base 24 has a continuous surface supporting the insulating layer 23.

The sensor 30 illustrated in FIG. 2C has a "suspended" type of structure in which the base 34 has a frame-type shape with a central opening 37a and the sensing layer 32 and its insulating layer 33 are suspended over the opening. Conductors 36 lead out from the measuring electrodes and conductors 38 lead out from the heater track to make contact with electrode pads 37 and 39, respectively, provided on the base 34.

Although it is not shown in the figures, another configuration involves providing a heating element on the underside of the membrane M, i.e. on the side of the membrane M where the hollowed-out portion 17 is located.

FIGS. 3A and 3B illustrate some typical layouts of measurement electrodes and a heater track within a gas sensor. In these diagrams only the heater track and measurement electrodes are represented, the other components of the gas sensor are not shown.

In the example illustrated in FIG. 3A the heater track 6 is in the form of a generally spiral-shaped conductive track, and the measurement electrodes 5 are planar electrodes spaced one from the other. In the example illustrated in FIG.

3B the heater track 6 is again in the form of a spiral-shaped conductive track, but the measurement electrodes 5a take the form of interdigitated comb-shaped electrodes. In this example there are five interdigitated electrode fingers in the measurement electrodes 5a; two of the electrode fingers are connected to a first bus bar and the other three electrode fingers are connected to a second bus bar. In FIG. 3A and FIG. 3B, there is an insulating layer between the heater tracks and the measurement electrodes. (not shown in the Figures).

When a batch of gas-sensors is produced, all having the same design of measurement electrodes and heating elements (i.e. all having measurement electrodes and heater tracks that have the same shapes, locations and dimensions), an assumption may be made that each device in the batch will attain the same operating temperature upon application of a particular voltage to the ends of the device's heater track. However, the manufacturing process often results in variations in physical characteristics between gas-sensors of a same batch, for example there may be differences in thickness and homogeneity of the membrane and of the heating material. As a result of such differences, application of a given voltage to the heater tracks of different individual sensors may result in heating of the gas-sensitive layers to different temperatures. This may lead to significant deviations between the measurements that are taken by the individual devices.

Moreover, a measurement obtained from a single gas sensor at a single operating temperature may be insufficient to enable a gas to be identified with a desired degree of certainty. The selectivity and/or the detection-accuracy of a gas sensor can be improved by increasing the number of data points used in detecting a given gas. Thus, for example, different measurements may be taken at times when the gas-sensitive layer is heated to different temperatures, and the set of measurements may be processed to enable a target gas to be detected. Unfortunately, such an approach tends to increase the period of time required for detection of the gas. For example, it can take several hundreds of microseconds to drive a micro-gas sensor through a sequence of different temperatures in order to take a series of measurements for characterizing a given gas sample.

Another approach involves use of a set of sensing elements, each exposed to the same gas but each heated to a different temperature. Unfortunately, such an approach tends to increase the size and cost of the device, as well as increasing the power consumption.

The present invention has been made in view of the above problems.

SUMMARY OF THE INVENTION

The preferred embodiments of the present invention provide a gas sensor, comprising:
a gas-sensitive layer; and
a heating element to heat the gas-sensitive layer, the heating element comprising a heater track having first and second outer electric terminals;
wherein:
the heater track has at least one inner electric terminal located between the outer electric terminals;
the heating element is configurable to set a temperature profile produced by the heater track; and
there is provided a control unit to configure the heating element by controlling the pattern of electric potentials applied to the inner and outer electric terminals of the heater track during use.

Gas sensors according to the invention have a heating element which is configurable because at least one inner electric terminal is provided on the heater track in addition to the usual outer electric terminals and a control unit is provided that is configured to be capable of varying the pattern of electric potentials applied to the electric terminals. The temperature profile produced by the heating element can be adjusted by the action of the control unit. The invention can be employed in different applications to exploit the configurable character of the heating element.

In certain embodiments of the invention the control unit is configured to select a pattern of electric potentials for application to the terminals of the heater track which, when applied, heat the gas-sensitive layer to a predetermined target temperature.

In such embodiments, the configurable nature of the heating element enables individual gas sensors to be calibrated, for example to compensate for variations in their physical characteristics deriving from the manufacturing process. For instance, in a given individual gas sensor its control unit can set the pattern of electric potentials that are applied to the terminals of the heater track so that the gas-sensitive layer is heated to a target design value even if the physical characteristics of this device deviate from design values due to manufacturing tolerances.

Moreover, the configurable nature of the heating element enables fine control of the pattern of temperature that is produced along the length of the heating track. Thus, the control unit may adjust the pattern of electric potentials applied to the outer and inner electrodes to achieve a uniform temperature over substantially the whole of the heating track.

In certain of the above-mentioned embodiments the control unit is configured to select, from among the outer and inner electric terminals, a pair of terminals between which to apply power, and to select, as said pair of terminals, the two terminals which, when power is applied therebetween, heat the gas-sensitive layer to a temperature having a deviation from the predetermined target temperature which is the smallest out of the deviations produced when power is applied between the different possible pairs of terminals.

In such embodiments, the control unit can choose which pair of terminals—from among the outer and inner electric terminals on the heater track—is best suited to receive power to ensure that the heater track heats the gas-sensitive layer to a target (e.g. design) temperature value. So, although some individual gas sensors may attain the target temperature value when power is applied between the outer electrodes (and the inner electrodes are floating), in other individual gas sensors the control unit may cause power to be applied between one outer and one inner electric terminal if this is necessary in order to ensure that the gas-sensitive material becomes heated to the correct temperature.

In certain of these embodiments the control unit is configured to make its selection, of which pair of terminals should receive power, dependent on test data and the test data includes information indicative of a temperature that is reached by the gas-sensitive layer when power is applied between two candidate terminals chosen from among the outer and inner terminals.

In such embodiments the control unit may, for example, receive test data indicating what temperature is reached by the gas-sensitive layer when power is applied between the outer terminals. Then, if the temperature during the test is too high, the control unit may determine that, during subsequent operation of the gas sensor, power should be applied between an inner electrode and one of the outer electrodes, or between two inner electrodes, so as to bring the temperature of the gas-sensitive layer during gas detection closer to the target value.

In certain embodiments of the invention the control unit is configured to select a pattern of electric potentials which, when applied to the terminals of the heater track, produce a temperature profile along the heater track, and the temperature profile comprising regions at different temperatures.

Such embodiments of the invention exploit the fact that the configurable nature of the heating element enables fine control of the pattern of temperature that is produced along the length of the heating track. However, in this instance, the fine control is exploited in order to produce a desired variation in the pattern of temperatures produced by the heating track.

In these embodiments the gas sensor may be provided with plural measurement electrodes to measure an electrical characteristic of the gas-sensing layer at different locations, and the control unit may be configured to produce different temperatures at the different locations where the measurement electrodes take measurements. In this way the gas sensor obtains, at the same time, plural measurements of the electrical characteristics of the gas-sensitive layer at different temperatures. Thus, a group of data points for use in characterizing a gas can be obtained rapidly and it is not necessary to perform a series of successive measurements at respective different temperatures, nor is it necessary to use an array of gas sensors each operating at a different temperature. Accordingly, the speed of gas detection can be increased and an increase in the size and cost of the gas sensor can be avoided.

Moreover, the control unit may be designed to produce different temperature profiles along the heater track, for example as part of a measurement protocol which involves successively establishing different temperature profiles and taking measurements. Such an arrangement can further multiply the number of data points obtained to characterise a gas sample without requiring an excessively long measurement time.

The arrangement of the heater track and measurement electrodes may be, as follows: the heater track has a meandering shape comprising plural bends and the inner terminals are located on the outside of bends in the heater track, and measurement electrodes are disposed inside bends of the heater track.

The above arrangement provides the advantage that connections to the inner terminals can be formed in a simple manner and by a low-cost process.

In gas sensors according to the invention the control unit may be configured to clean a selected part of sensing material on the length of the heater track by applying power between an inner terminal of the heating track and another electric terminal of the heater track, the selected part of the length of the heater track being the part between the inner electric terminal and the other electric terminal.

The above arrangement overcomes a problem that may otherwise arise when sensing material that is positioned relatively further away from the centre of the heating track spends a lot of time at relatively low operating temperature. In such a case, the sensing material is easily poisoned and the recovery time thereof is very long. In cases where the control unit is configured to clean a selected part of sensing material on a certain part of the length of the heater track, by applying power between an inner terminal and another electric terminal of the heater track, poisoning of such portions of the sensing material can be avoided. In addition, the power required to perform the cleaning process is reduced compared to conventional techniques.

The preferred embodiments of the present invention further provide a method of calibrating a gas sensor comprising a gas-sensing layer, a heating element to heat the gas-sensing layer, the heating element comprising a heater track having first and second outer electric terminals and at least one inner electric terminal located between the outer electric terminals, and a control unit to control a pattern of electric potentials applied to the electric terminals, the method comprising:
  applying power between a pair of candidate electric terminals selected among the inner and outer electric terminals of the heater track;
  determining the temperature attained by the gas-sensing layer when power is applied between the candidate electric terminals;
  comparing the determined temperature with a predetermined target temperature; and
    calibrating the control unit, based on the result of the comparing, to select a pair of terminals between which to apply power to heat the gas-sensing layer to the predetermined target temperature.

Such embodiments exploit the configurable nature of the heating element to enable individual gas sensors to be calibrated, for example to compensate for variations in their physical characteristics deriving from the manufacturing process.

The preferred embodiments of the present invention further provide a method of operating a gas sensor comprising a gas-sensitive layer, a heating element to heat the gas-sensitive layer, the heating element comprising a heater track having first and second outer electric terminals and at least one inner electric terminal located between the outer electric terminals, a control unit to control a pattern of electric potentials applied to the electric terminals, and plural measurement electrodes disposed at different locations relative to the electric terminals of the heater track, the method comprising:
  controlling, by the control unit, electric potentials applied to the terminals of the heater track, to produce along the heater track a temperature profile heating different ones of said plural measurement electrodes to different temperatures; and
  determining the electrical characteristics of the gas-sensing layer at said different temperatures by measuring the set of signals produced by said different ones of the measurement electrodes during heating of the measurement electrodes by said temperature profile.

Such embodiments exploit the configurable nature of the heating element to establish, at a given time, regions of the gas-sensitive layer that are at different temperatures. This makes it possible to determine the characteristics of the gas-sensitive layer at these different temperatures all at the same time, using the plural measurement electrodes. Accordingly, the time required to acquire measurement data characterizing the response of the gas-sensitive layer at different temperatures can be reduced without needing to make use of an array of gas sensors. Of course, if using an array of gas sensors fabricated in accordance with these embodiments then the speed of acquisition of measurement data at different temperatures is increased and the number of data points may be multiplied by the number of gas sensors in the array.

BRIEF DESCRIPTION OF THE DRAWINGS

The above and other features, advantages and applications of the present invention will become more apparent from the following description of preferred embodiments thereof, given by way of non-limiting examples, and the accompanying drawings, in which:

FIGS. 2A to 2C show diagrams illustrating the general structure of semi-conducting metal-oxide gas sensors having a micro-hotplate architecture, in which:

FIG. 2A is a cross-sectional view illustrating the overall structure of a micro-hotplate type architecture, FIG. 2B illustrates a "closed" type of micro-hotplate architecture, and FIG. 2C illustrates a "suspended" type of micro-hotplate architecture;

FIGS. 3A and 3B show diagrams illustrating some know layouts of heater tracks and measurement electrodes in gas sensors, in which:

FIG. 3A illustrates a layout using a pair of planar measurement electrodes, and

FIG. 3B illustrates a layout using interdigitated comb-shaped measurement electrodes;

FIGS. 5A to 5C illustrate examples of temperature patterns that may be established by connecting different electric potentials to a heater track in the heater assembly of FIG. 4, in which:

FIG. 5A illustrates an example of a temperature pattern achieved by applying power between terminals A and D of the heater track in the heater assembly of FIG. 4, FIG. 5B illustrates an example of a temperature pattern achieved by applying power between terminals A and B of the heater track in the heater assembly of FIG. 4, and FIG. 5C illustrates an example of a temperature pattern achieved by applying power between terminals B and E of the heater track in the heater assembly of FIG. 4;

DESCRIPTION OF EMBODIMENTS OF THE INVENTION

Figure 4:
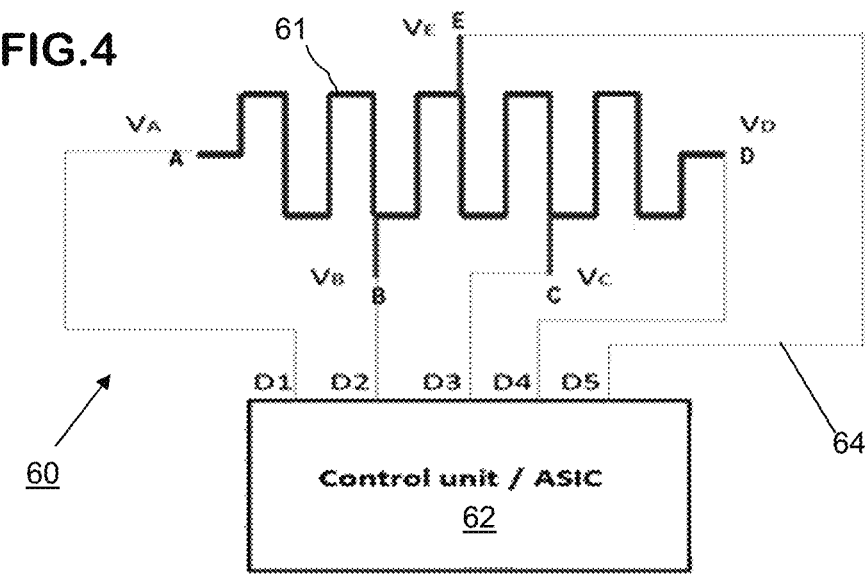
FIG. 4 illustrates an example of a heater assembly that may be used in a gas sensor according to an embodiment of the invention.

FIG. 4 illustrates an example of a heater assembly 60 that may be used in a gas sensor according to a first embodiment of the invention. FIG. 4 does not show details of the remainder of the gas sensor (e.g. gas-sensitive layer, measurement electrodes to detect the reaction of the gas-sensitive layer to gas species, and so on).

In the heater assembly 60 of FIG. 4, a heating element in the form of an electrically-conductive heater track 61 is connected to a control unit 62 by conductors 64. The control unit 62 is connected to a source of electrical power (not shown) of any convenient type, e.g. a battery, a mains power source, and so on. If desired, one or more temperature sensors may be associated with the heater assembly to detect the actual temperature(s) produced by the heater track at one or more locations of interest.

Figure 1:
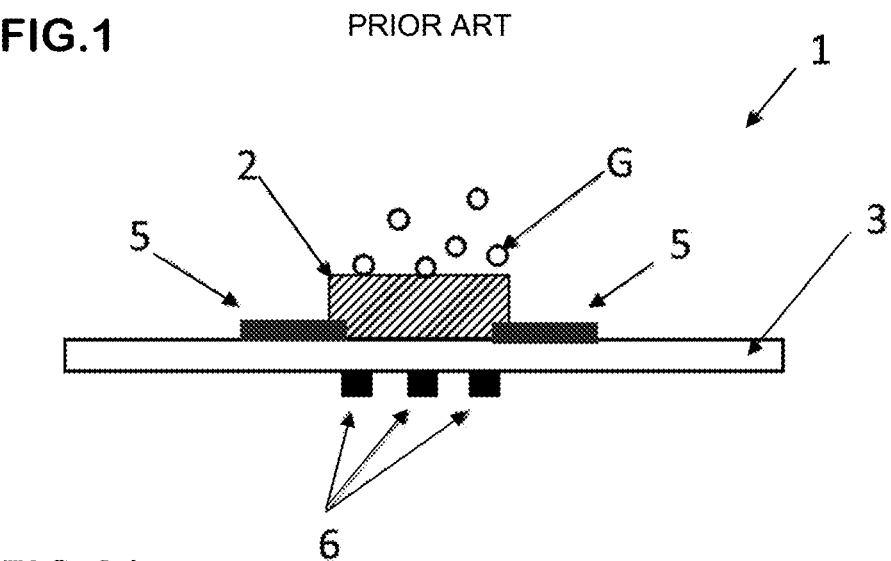
FIG. 1 is a diagram indicating schematically, in cross-section, the general structure of a semi-conducting metal-oxide gas sensor.
Figure 2A:
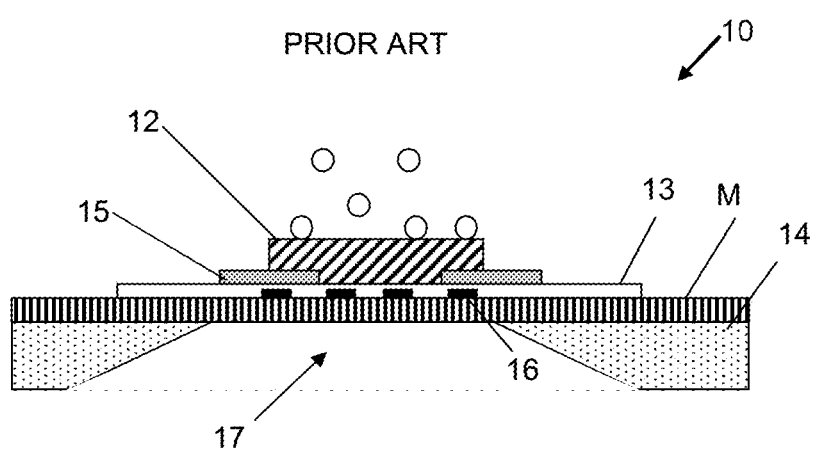
Figure 2B:
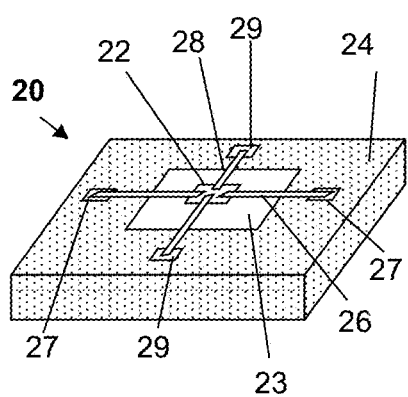
Figure 2C:
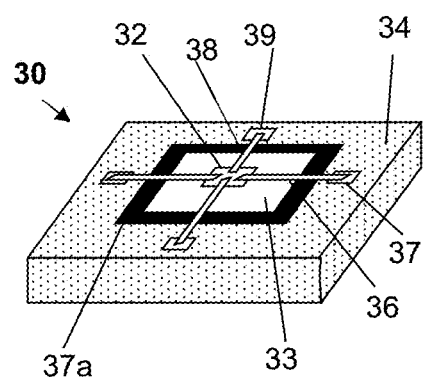
Figure 3A:
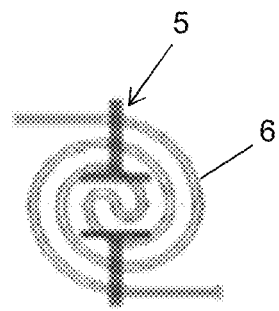
Figure 3B:
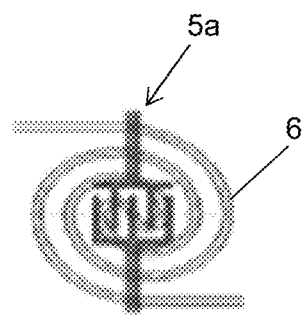

The heater track 61 may be formed of any convenient material, such as a conductive material of the usual types employed in heating elements of gas sensors. For example, the heater track 61 may be made of: Pt, Au, SiC, poly-Si, TiN, and so on. The heater track 61 may be formed by various processes, for example: sputtering, e-beam evaporation, CVD, electroplating, and so on, and the formation process may be chosen taking into account the nature of the material forming the heater track 61 and the nature of dielectric materials on the substrate. The formation process may be chosen taking into account the nature of the surface upon which the heater track is formed. The location of the heater track 61 may be different in different models of gas sensor. Thus, for example, the heater track 61 may be disposed in contact with the gas-sensitive layer as in a catalytic combustion type of gas sensor. As another example, the heater track 61 may be disposed on the other side of an insulating layer from the gas-sensitive layer as in the gas sensor illustrated in FIG. 2A. As another example, the heater track 61 may be disposed under a substrate or membrane upon which the gas-sensitive layer is formed. Other layouts are also permitted.

According to the example of FIG. 4 the heater track 61 has a meandering shape including a sequence of bends. The use of a meandering shape for the heater track makes it possible to perform intensive heating of an extended surface area. In this example, the bends in the meandering shape are angular and each bend has two corners each at an angle of about 90°. However, the invention can be usefully applied in association with substantially any type of heater. For example, it is not essential for the bends to be angular; the bends may have a rounded shape, a bevelled shape, and so on. Furthermore, a linear heater track (without bends) could also be used. MEMS technology makes it possible to vertically connect two layers, thus increasing flexibility regarding the shape of the heater track.

The heater track 61 has connection terminals for application of electric potential and, in this example, there are outer connection terminals (labelled A and D) located at the ends of the heating track 61, as well as three inner connection terminals (labelled B, E and C) located at positions along the heating track 61 between the outer terminals. In the example illustrated in FIG. 4 there are three inner terminals B, E and C between the outer terminals A and D. However, in other example, between the outer terminals there may be a single inner terminal, two inner terminals, or more than three inner terminals. A respective conductor 64 connects each of the inner and outer terminals, A-E, of the heater track 61 to a control output, D1-D5, of the control unit 62.

In the example illustrated in FIG. 4 each of the inner conductors B, E and C is connected to the heater track 61 at a respective position that is on the outside of a bend in the heater track. By disposing the inner electrodes at the outside of bends in the heater track 61 it is relatively simple to connect the conductors 64 to the inner terminals. Further, in this example the inner terminals B, E and C are spaced irregularly from one another, that is, there is a different length of heater track between the inner terminals B and E than there is between the inner terminals E and C. In a similar way, there is a different length of heater track between the outer terminal A and the inner terminal B than there is between the inner terminal C and the outer terminal D. However, the inner terminals may be disposed at regular spacings along the heater track, and the spacing between the outer terminals and the adjacent inner terminal may be the same at each end of the heater track. Furthermore, the number of terminals is not particularly limited, but the selection of the number of terminals should take into account heat transfer through the terminals.

The conductors 64 that connect the inner and outer terminals A-E to the control unit 62 may be formed of any suitable material, for example conductive materials typically used in integrated circuits. However, it is appropriate to set the size and thickness so as to reduce heating of these conductors 64 (to reduce thermal energy transfer from the heater track 61 to the conductors 64).

The control unit 62 may be implemented in various forms including, but not limited to, in the form of an application-specific integrated circuit (ASIC) control chip or a general control unit which is composed of analogue circuits and MCU chip, and so on.

In this example the control unit 62 has five control outputs D1-D5 and is configured to control the set of electric potentials $\{V_A, V_B, V_C, V_D, V_E\}$ that are applied to the terminals A-E of the heating track using the control outputs D1-D5.

Figure 5A:
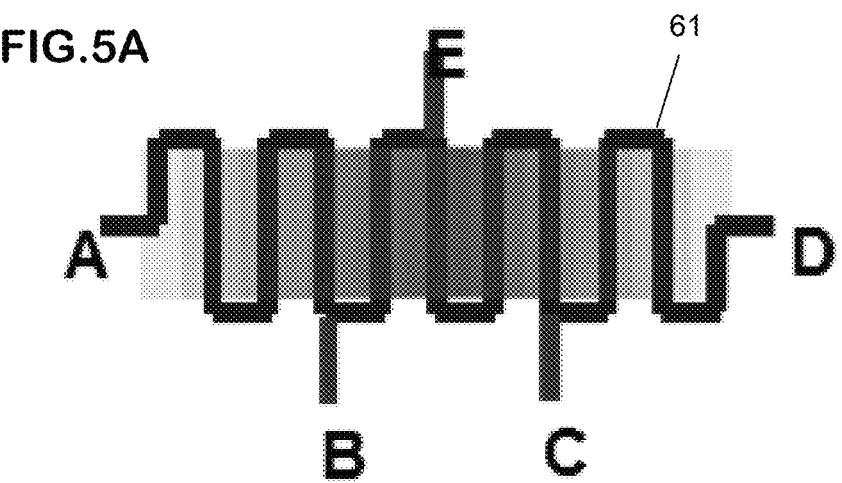

As one example, the control unit 62 may output selected voltages at its control outputs so that power is applied between terminal A and terminal D of the heating track 61, with no voltage applied to the inner electrodes. As a result the voltages $V_B$, $V_E$ and $V_C$ at the inner terminals B, E and C respectively simply reflect the voltage drop that takes place along the heater track 61. FIG. 5A illustrates the heating pattern produced in a case of applying power between the outer terminals A and D, with a darker shading representing a higher temperature. It can be seen that, in the example of FIG. 5A, at a given location along the length of the heater track the temperature is substantially the same across the width of the heater track. On the other hand, the temperature varies in the length-wise direction. The "width-wise direction" here is the vertical direction in FIG. 5A and the "lengthwise direction" is the horizontal direction in FIG. 5A. In this example there is a high-temperature region over approximately the central third of the heater track in the lengthwise direction and the temperature reduces towards the ends of the heater track.

Figure 5B:
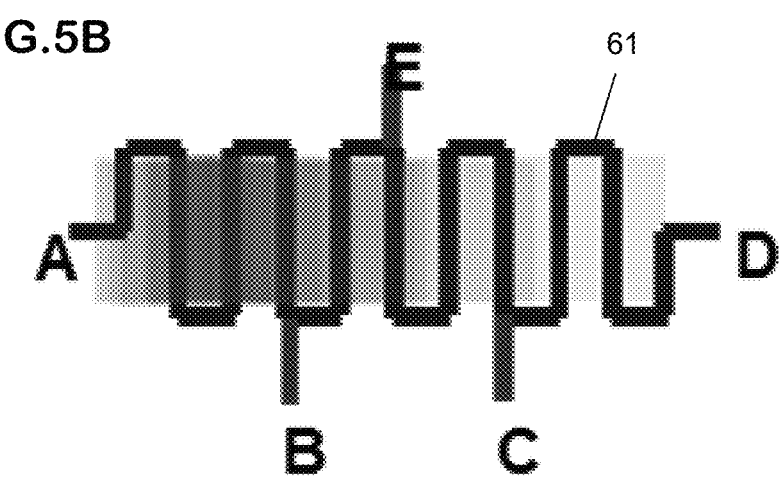

As another example, the control unit 62 may output selected voltages at its control outputs so that power is applied between terminal A and terminal B of the heating track 61, with no voltage applied to the inner terminal E and C or to the outer terminal D. FIG. 5B illustrates the heating pattern produced in this case. It can be seen that, in the example of FIG. 5B, a high-temperature region is produced between terminals A and B and the temperature drops progressively from inner terminal B towards outer terminal D.

Figure 6:
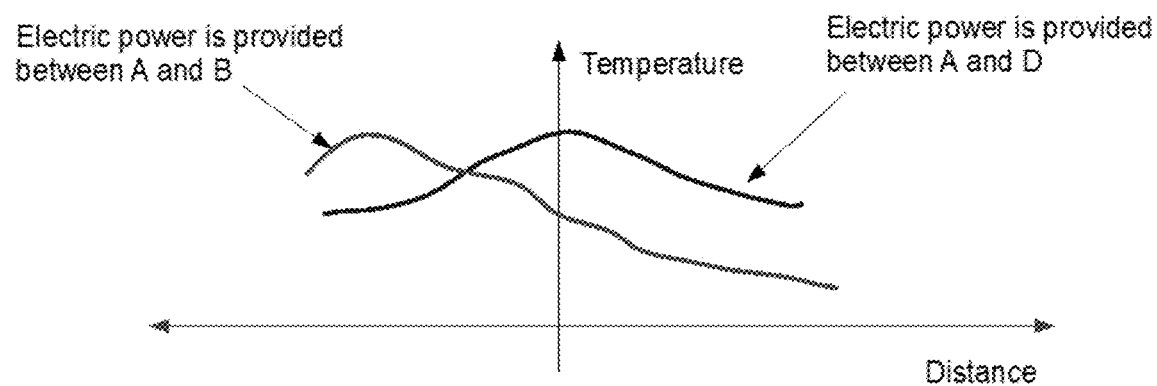
FIG. 6 shows a graph representing how temperature varies along the length of the heating track of the heater assembly shown in FIG. 4 upon application of different potentials to the electric terminals.

FIG. 6 is a graph illustrating how temperature varies along the length of the heater track 61 in the examples of FIGS. 5A and 5B. The y-axis in FIG. 6 represents the temperature and the x-axis represents distance along the heater track (with the location where the axes cross representing a position midway along the length of the heater track 61).

Figure 5C:
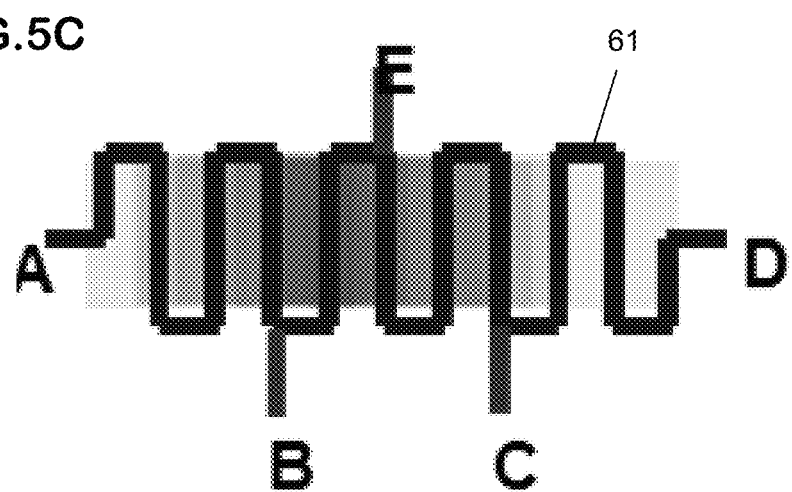

As another example, the control unit 62 may output selected voltages at its control outputs so that power is applied between inner terminal B and inner terminal E of the heating track 61, with no voltage applied to the inner terminal B or to the outer terminals A and D. FIG. 5C illustrates the heating pattern produced in this case. It can be seen that, in the example of FIG. 5C, a high-temperature region is produced between terminals B and E and the temperature drops progressively from inner terminal B towards outer terminal A as well as from inner terminal E towards outer terminal D.

The examples described above are not exhaustive but they are sufficient to demonstrate that control of the voltages applied to the outer and inner terminals can produce different temperature patterns, for example different temperature profiles along the length of the heater track. The temperature pattern produced by the heater track can be configured by appropriate control, by the control unit 62, of the set of voltages applied at the inner and outer terminals of the heater track.

The configurable heating element provided by embodiments of the present application can be employed in various different applications to address various technical problems.

In a first application, configurable gas sensors embodying the invention may be used to enable calibration to compensate for variations in their physical properties (notably, variations arising due to the manufacturing process). For such an application a configurable gas sensor according to the invention may incorporate a heater assembly 60 as illustrated in FIG. 4, together with a temperature sensor (not shown), as well as the other components of a gas sensor (gas-sensitive material, measurement electrodes for detecting the changing properties of the gas-sensitive layer upon exposure to a gas sample, and so on—not shown).

A batch of such gas sensors may be manufactured according to a specification which specifies that application of a voltage of X volts across the outer terminals A and D of the heater track should heat the gas-sensitive material to a predetermined target temperature of Y degrees Celsius. The values of X and Y which are appropriate depend on the application. However, in many typical applications X may range from 0.5 to 5 volts and Y may range from 150 to 500 degrees Celsius in gas sensors employing a heater track having a resistance of 10 or 500 Ohms, bearing in mind that values outside these ranges may be appropriate in certain applications. In a given individual gas sensor the heating performance of the heater track 61 may depart from the specification and, perhaps, the temperature of the gas-sensitive material may be raised to the predetermined target temperature not by applying power between the outer terminals A and D but by applying power between a different pair of terminals (e.g. between inner terminal B and outer terminal D). Upon calibration, the control unit 62 can control the application of power to the terminals so that the optimum pair of terminals is used.

An example will now be described, with reference to FIG. 8, of a method for calibrating a configurable gas sensor according to the invention.

Figure 8:
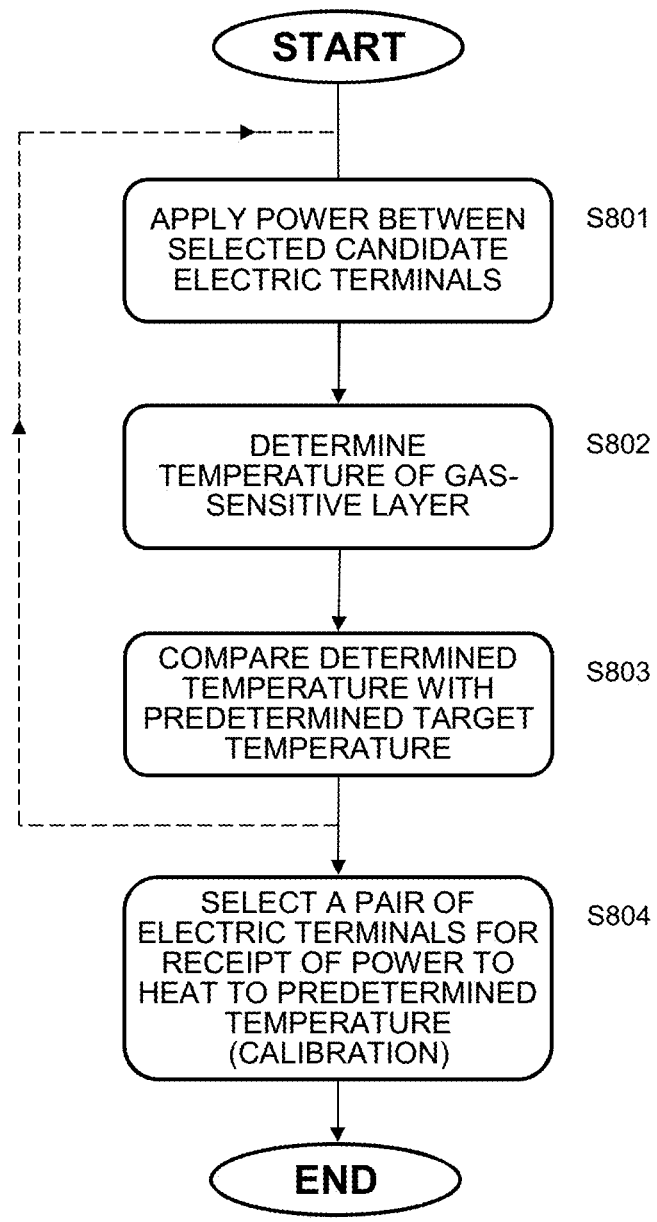
FIG. 8 is a flow diagram illustrating an example of a calibration method according to an embodiment of the invention.
Figure 9:
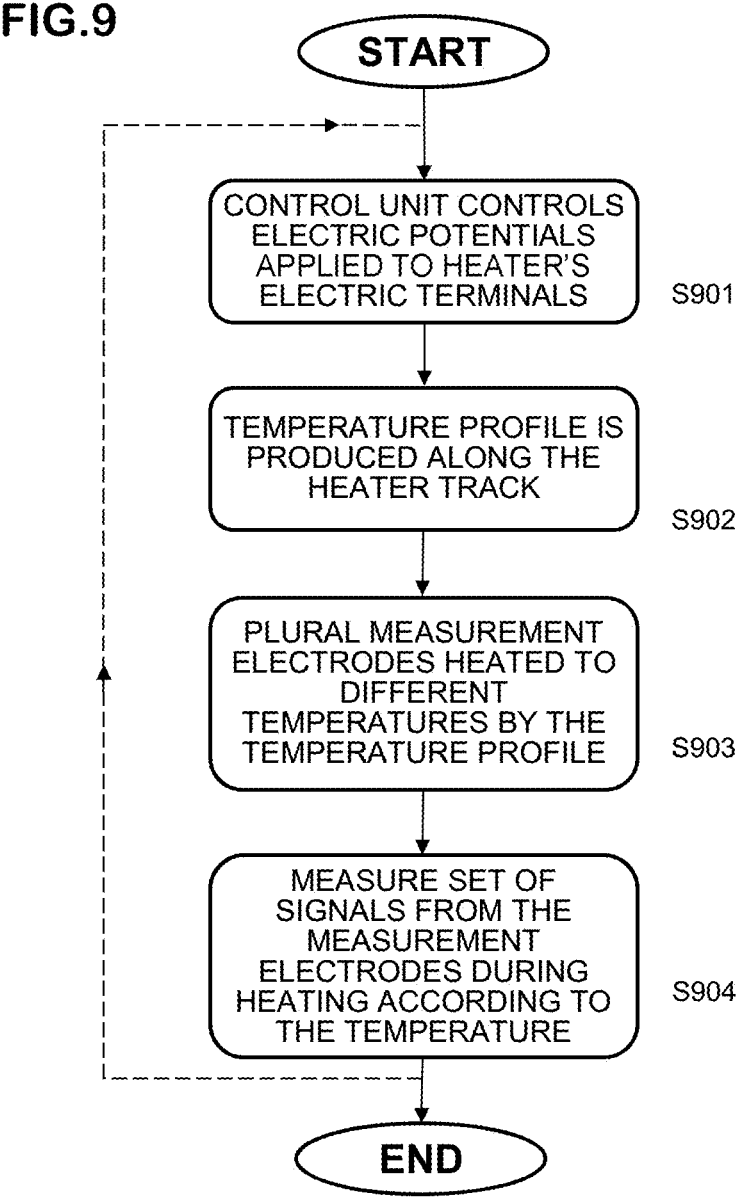
FIG. 9 is a flow diagram illustrating an example of a calibration method according to an embodiment of the invention.

According to the method of FIG. 8, a candidate pair of electric terminals is selected from among the inner and outer electric terminals of the heater track and power is applied between the candidate pair of terminals (S801). When power is applied between the candidate electric terminals the heater track heats up and this increases the temperature of the gas-sensitive layer in the gas sensor. When the temperature of the gas-sensitive layer becomes stable a measurement of the temperature is taken (S802), typically using a temperature sensor of the gas sensor (although use of an external temperature sensor is not excluded). The temperature reached by the gas-sensitive layer is compared to a predetermined target temperature (S803).

The operations S801-S803 may be performed, for example, for a candidate pair of terminals which correspond to the outer terminals of the heater track, to judge whether the predetermined target temperature can be attained when power is applied between the outer terminals. As illustrated by the dashed arrow in FIG. 8, the operations S801-S803 may be repeated using a different selection for the candidate pair of terminals, one or more times, so that data is gathered the same surface of a support (substrate, membrane) as the heater track 61 but this is not essential; the measurement electrodes could be formed on one major surface of a support layer with the heater track being formed on the other major surface.

Figure 7:
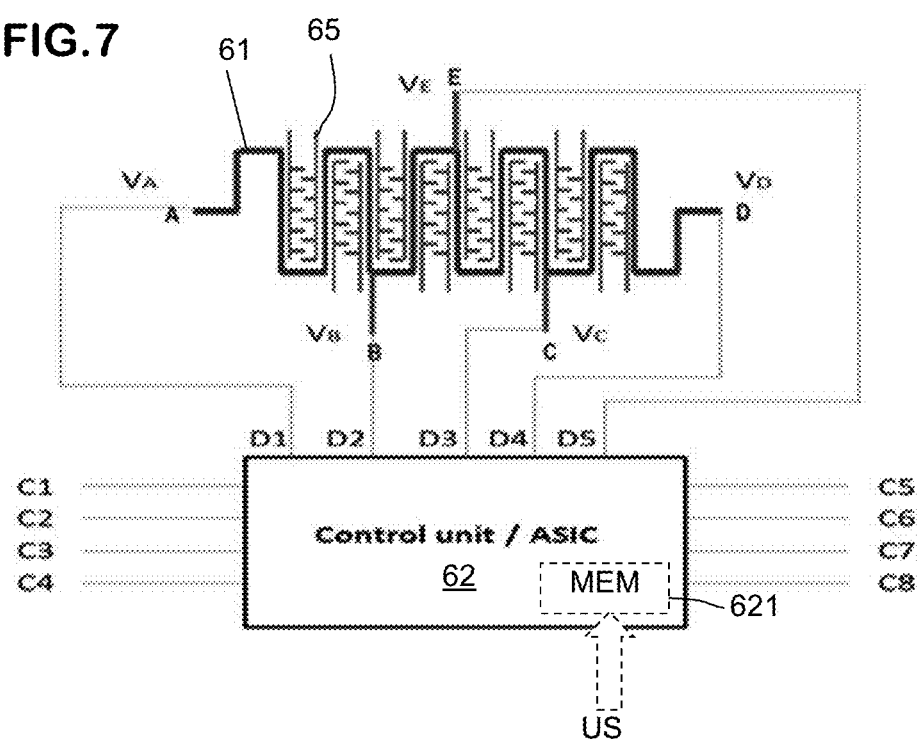
FIG. 7 illustrates another example of a heater assembly according to an embodiment of the invention.

In the example of FIG. 7 the control unit 62 is driven by a set of eight control inputs C1-C8 which determine the voltages produced at the five control outputs D1-D5 of the control unit 62. With eight control inputs C1-C8 there are 256 different control modes that can be implemented. In this example the control inputs specify values for control voltage outputs on D1-D5 as well as durations during which the voltages are applied. Table 1 below shows some temperature/voltage output profiles defined by control inputs C1-C8 according to one example.

TABLE 1 some example control profiles (P = Voltage of output terminals in Volts
T = Time in sec)

| Mode | | | | | | | | D1 | | D2 | | D3 | | D4 | | D5 | |
|---|---|---|---|---|---|---|---|---|---|---|---|---|---|---|---|---|---|
| C1 | C2 | C3 | C4 | C5 | C6 | C7 | C8 | P | T | P | T | P | T | P | T | P | T |
| 0 | 0 | 0 | 0 | 0 | 0 | 0 | 0 | 0 | 0 | 0 | 0 | 0 | 0 | 0 | 0 | 0 | 0 |
| 0 | 0 | 0 | 0 | 0 | 0 | 0 | 1 | 5 | 1 | open | 1 | open | 1 | 0 | 1 | open | 1 |
| 0 | 0 | 0 | 0 | 0 | 0 | 1 | 0 | 5 | 1 | 0 | 1 | open | 1 | open | 1 | open | 1 |
| 0 | 0 | 0 | 0 | 0 | 0 | 1 | 1 | open | 1 | 5 | 1 | 0 | 1 | open | 1 | open | 1 |
| 0 | 0 | 0 | 0 | 0 | 1 | 0 | 0 | 0 | 1 | 5 | 1 | open | 1 | 5 | 1 | 0 | 1 |
| 0 | 0 | 0 | 0 | 0 | 1 | 0 | 1 | 0 | 0,5 | 3 | 0,5 | open | 0,5 | 3 | 0,5 | 0 | 0,5 |
| 0 | 0 | 0 | 0 | 0 | 1 | 1 | 0 | 0 | 0,5 | 3 | 0,5 | open | 0,5 | 0 | 0,5 | open | 0,5 |
| — | — | — | — | — | — | — | — | — | — | — | — | — | — | — | — | — | — |
| 1 | 1 | 1 | 1 | 1 | 1 | 0 | 1 | 2 | 5 | open | 5 | open | 5 | 0 | 5 | open | 5 |
| 1 | 1 | 1 | 1 | 1 | 1 | 1 | 0 | 2 | 5 | 0 | 5 | open | 5 | open | 5 | open | 5 |
| 1 | 1 | 1 | 1 | 1 | 1 | 1 | 1 | open | 5 | 2 | 5 | 0 | 5 | open | 5 | open | 5 | regarding the temperature achievable using different combinations of the electric terminals.

The gas sensor is then calibrated (S804), that is, a choice is made of a pair of electric terminals to which the control unit 62 will apply power, during operation, to drive the temperature of the gas-sensitive layer to the desired target temperature (or as close as can be achieved using the inner and outer terminals on the heater track).

The operations S801-S804 may all be performed by the control unit 62. However, in principle these operations could be performed by external circuitry and the results then used to program the control unit 62.

The above-described method, exploiting the configurable nature of the heating element in the invention, enables gas sensors to be calibrated to reduce variations in performance among devices produced by mass manufacturing processes.

A second application will now be described, which exploits configurable gas sensors according to the invention. This second application enables plural measurements of the properties of a gas-sensitive layer to be taken at the same time but at different temperatures.

Figure 10:
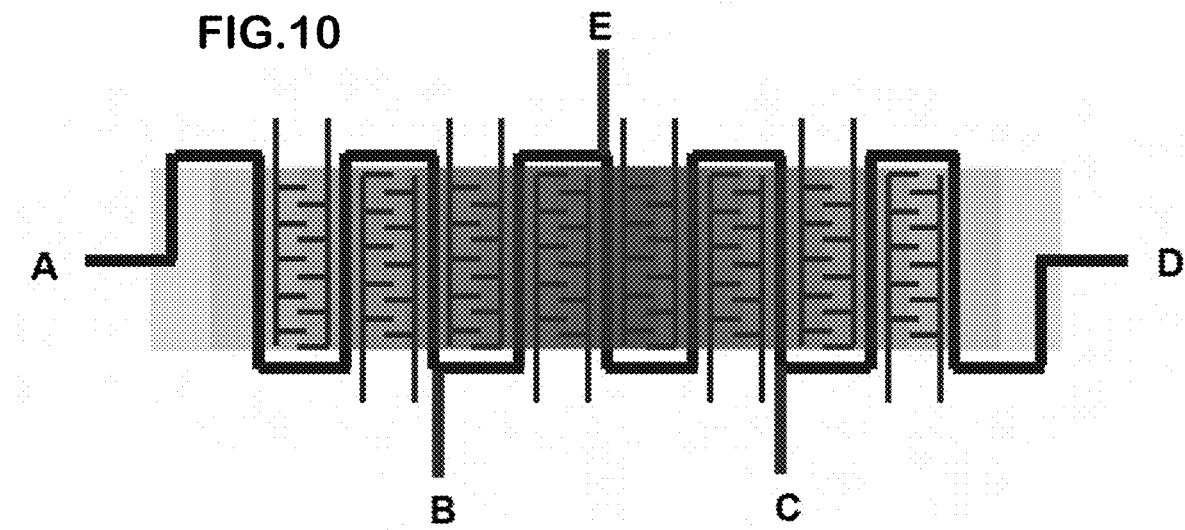
FIG. 10 illustrates an example of a temperature profile formed so that different measurement electrodes are at different temperatures.

FIG. 7 illustrates an example of a configurable gas sensor based on the example of FIG. 4, applied in the second application. In the example illustrated in FIG. 7, a respective measurement electrode 65 is disposed in each "pocket" of the heater track 61 (i.e. within the inner side of each bend in the heater track 61). In this example each measurement electrode 65 includes a pair of interdigitated comb-shaped electrodes, but other forms of measurement electrode may be used. The measurement electrodes 65 may be formed on The voltages applied to the terminals of the heater track 61 at a given time may create a temperature pattern over the heater track 61 such that different temperatures are experienced by the different measurement electrodes 65 (and, correspondingly, by the regions of gas-sensitive material that are adjacent to the different measurement electrodes 65)—FIG. 10 illustrates this situation in an example where power is applied between terminals A and D. Thus, at the same time the different measurement electrodes 65 are measuring the reaction of the gas-sensitive material to a gas sample at different temperatures. This produces a rich data set in a very short period of time.

Configurable gas sensors according to the invention can be driven to partially heat the heater track, that is, to apply power between a pair of terminals that span only part, not the whole, of the length of the heater track. This partial heating can provide enough thermal energy to all sensing materials which are prepared on the heater track, for example for cleaning purposes. This improves the recovery time of a section of heater track which might otherwise be slow to recover after a measurement operation. Such partial heating involves the control unit cleaning a selected part of the length of the heater track by applying power between an inner terminal of the heating track and another electric terminal of the heater track (the selected part of the length of the heater track is the part between the inner electric terminal and the other electric terminal).

In this second application a gas sensor may, for example, be operated according to the following method. The control unit controls electric potentials applied to the terminals of the heater track (S901). When the voltages are applied to the terminals of the heater track 61 this produces a temperature profile along the heater track (S902), and the temperature profile heats different ones of the plural measurement electrodes 65 to different temperatures (S903). The electrical characteristics of the gas-sensing layer at these different temperatures is determined by measuring the set of signals produced by the different ones of the measurement electrodes during heating of the measurement electrodes by the temperature profile (S904).

If desired, the operations S901 to S904 may be repeated, with the control unit 62 applying a different set of voltages to the terminals of the heater track, in order to generate more measurement data.

The control profile applied by the control unit 62 can be expressed in terms of various parameters including, but not limited to: temperature, voltage, duty cycles of pulse width modulation (PWM), power dissipated through the pairs of terminals, and so on.

The control unit 62 may have a memory 621 which stores various control profiles. The control profiles in the memory may be updated, for example based on a calibration process (to improve repeatability). An update signal US may be applied to a terminal of the control unit 62 to update the control profiles in the control memory 621.

Figure 11:
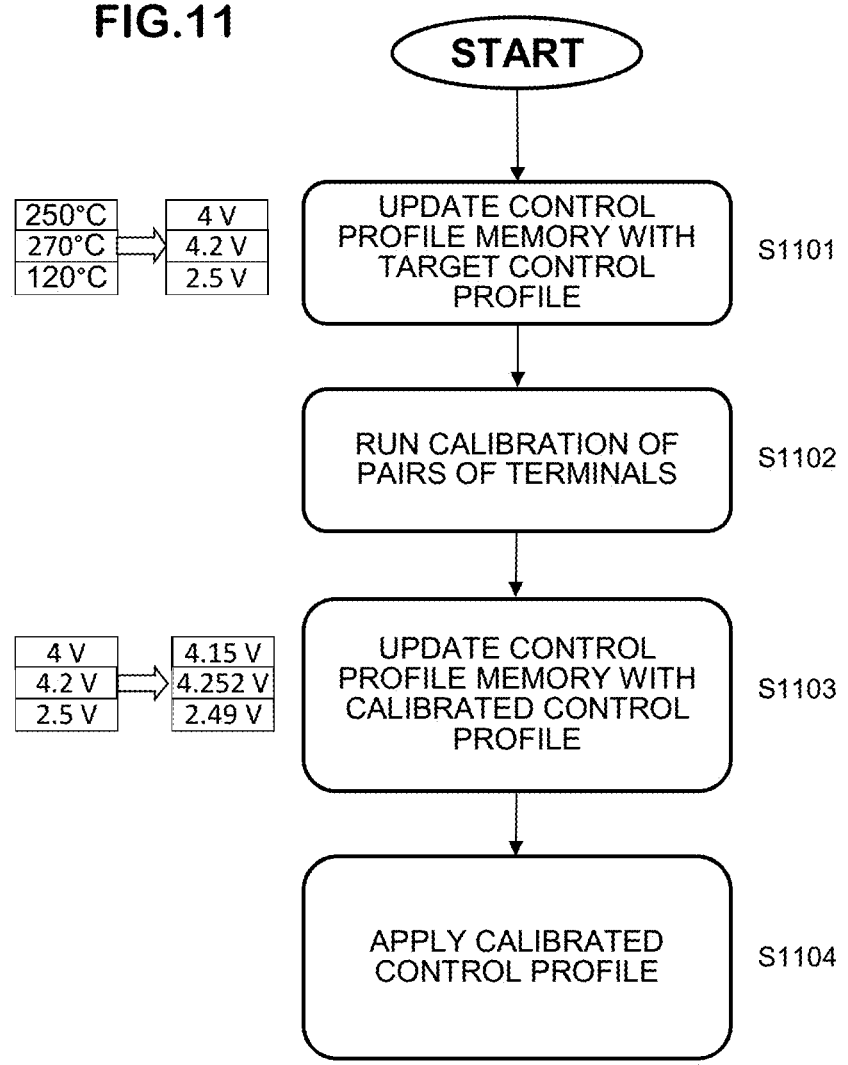
FIG. 11 is a flow diagram illustrating an example of a method of calibrating control profiles according to an embodiment of the invention.

FIG. 11 illustrates an example of one method of generating a calibrated control profile in the control profile memory 621. An update signal US may supply the control profile memory 621 with data regarding an uncalibrated control profile which is intended to produce target temperatures at one or more locations. An example will be considered in which target temperatures of 250° C., 270° C. and 120° C. are to be produced at a particular location and the uncalibrated profile specifies application of voltages of 4 volts, 4.2 volts and 2.5 volts between specified terminals of the heater track (S1101).

The control unit 62 then runs a calibration process (S1102) in which the stated voltages are applied to the specified terminals and a determination is made as to whether or not the target temperatures are achieved. If the target temperature is not achieved upon application of the specified voltage to the specified terminals then the control unit 62 may repeat the process (one or multiple times) while making an adjustment.

The adjustment may consist in applying an adjusted voltage to the specified terminals. For example, the control unit may apply an adjusted voltage which is modified from the previous voltage by a determined amount (which may be a fixed increment, a fraction of the previously-applied voltage, or an amount determined by calculation, for example taking into account previously-tried voltages). The control unit 62 then determines the voltage which, when applied to the specified terminals, produces a temperature as close as possible to the target temperature. Thus, for example, it may be determined that a voltage of 4.15 volts, not 4 volts, must be applied to the specified terminals in order to attain a temperature of 250° C., a voltage of 4.252 volts, not 4.2 volts, must be applied to the specified terminals in order to attain a temperature of 270° C., and a voltage of 2.49 volts, not 2.5 volts, must be applied to the specified terminals in order to attain a temperature of 120° C.

As an alternative, the adjustment may consist in applying the specified voltage to a different pair of terminals. For example, instead of applying a voltage of 4 volts between terminals A and C the same voltage may be applied between terminals A and E.

Based on the measurements made during the calibration process, the control unit 62 determines how to adjust the original (uncalibrated) control profile to improve the accuracy of the relationship between the specified voltages and terminals and the attained temperatures, and updates the data in the memory 621 to store a calibrated control profile (S1103). In the example of FIG. 11 the undated control profile includes adjusted values of voltages to be applied to specified terminals. Of course, the control unit 62 could update the control profile both to modify the values of the specified voltages and the identities of the terminals between which power is to be applied.

During subsequent operation, when the control unit 62 is operated to apply the target control profile it will make use of the calibrated control profile stored in the memory 621.

In practice, in configurable gas sensors of the types illustrated in FIG. 4 and FIG. 7 when applying power between a selected pair of terminals it is useful, in addition to controlling the voltages at the terminals, to measure the current flowing through the selected pair of terminals. Such a current measurement enables the heater resistance to be determined. The heater temperature can also be determined from such a current measurement. Thus, current measurement circuitry (not shown) can be provided in the gas sensor.

A third application will now be described, which exploits configurable gas sensors according to the invention. This third application enables plural measurements of the properties of a gas-sensitive layer to be taken at the same time, and at the same temperature but at different locations.

A configurable gas sensor according to the invention may be provided with plural measurement electrodes, as in the example of FIG. 7, enabling it to measure an electrical characteristic of the gas-sensing layer at different locations, and the control unit may be configured to produce the same temperatures at the different locations where the measurement electrodes take measurements. In this way the gas sensor obtains, at the same time, plural measurements of the electrical characteristics of the gas-sensitive layer at same temperatures. Thus, a group of data points for use in characterizing a gas can be obtained rapidly in replicate to improve reliability of the measurements and it is not necessary to perform a series of successive measurements at the same temperatures, nor is it necessary to use an array of gas sensors each operating at the same temperature.

Figure 12:
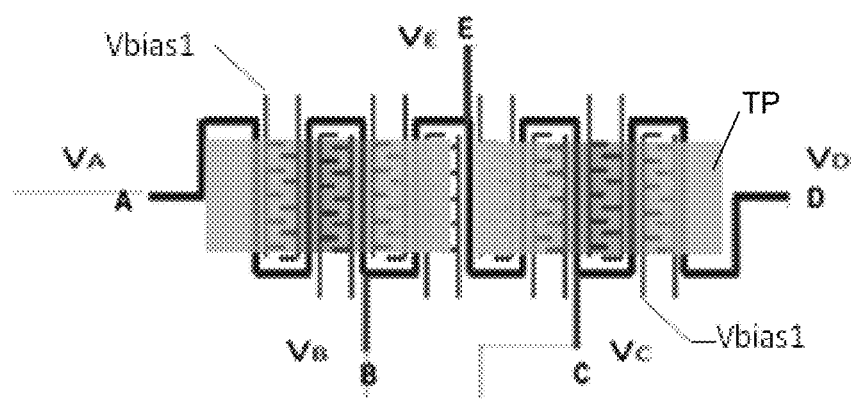
FIG. 12 is a diagram illustrating an application in which plural measurements are taken by plural measuring electrodes at a common temperature.

FIG. 12 illustrates an example of this third application. In the example illustrated in FIG. 12, VB=VC and VA=VD, and two patches of shading labelled TP illustrate the temperature profiles produced on the left-hand side and right-hand side of terminal E of the heater track. The greyscale darkness of the shading in the temperature profiles TP correlates to temperature, and so it can be seen that the highest temperature regions are just to the left of terminal B and just to the right of terminal C. In this example, the outermost measurement electrodes (situated at the left and right in FIG. 12) are at the same temperature. Moreover, the bias voltages applied to these outermost measurement electrodes are set at the same value, Vbias1. Thus, these two outermost measurement electrodes are taking measurements under substantially the same measurement conditions and should, in theory, produce identical outputs. The plural measurements taken under the same measurement conditions can be processed statistically to produce a measurement having a higher confidence level than a single measurement; for instance, an average of the measurements produced by the outermost measurement electrodes may be taken, to reduce errors.

It should be noted that although the example of FIG. 12 illustrates one particular pattern of temperature along the heater track, and a particular set of voltages applied to the terminals A-E, the advantages of this third application can still be obtained in cases using other patterns of applied voltages, and other temperature profiles, as long as at last two of the measurement electrodes are positioned at locations where the temperature is substantially the same.

A fourth application will now be described, which exploits configurable gas sensors according to the invention. This fourth application enables plural measurements of the properties of a gas-sensitive layer to be taken at the same time, and at the same temperature but at different locations and upon application of different bias voltages.

A configurable gas sensor according to the invention may be provided with plural measurement electrodes, as in the example of FIG. 7, enabling it to measure an electrical characteristic of the gas-sensing layer at different locations and at different bias voltages, recalling that the sensitivity of a measuring electrode 65 is linked to the polarization of the sensing layer and that a bias voltage is applied to each measurement electrode 65. In this way the gas sensor obtains, at the same time, plural measurements of the electrical characteristics of the gas-sensitive layer at same temperatures and at different bias voltages. Thus, a group of data points for use in characterizing a gas can be obtained rapidly and it is not necessary to perform a series of successive measurements at the same temperatures, nor is it necessary to use an array of gas sensors each operating at the same temperature.

Figure 13:
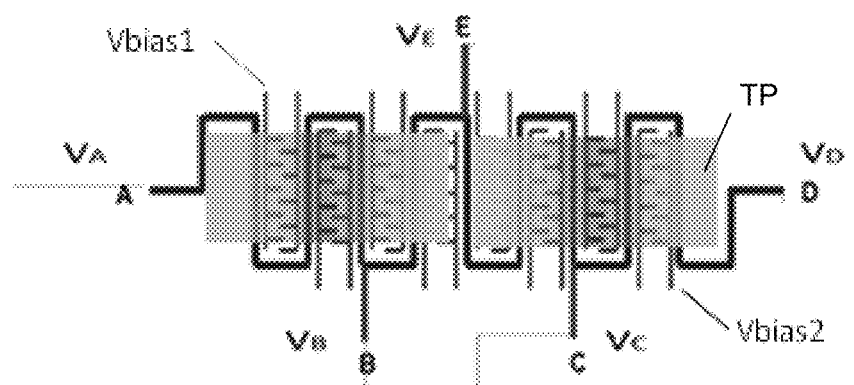
FIG. 13 is a diagram illustrating an application in which plural measurements are taken by plural measuring electrodes to which different bias voltages are applied.

FIG. 13 illustrates an example of this fourth application. In the example illustrated in FIG. 13, again VB=VC and VA=VD, and two patches of shading labelled TP illustrate the temperature profiles produced on the left-hand side and right-hand side of terminal E of the heater track. Again, the greyscale darkness of the shading in the temperature profiles TP in FIG. 13 correlates to temperature. The temperature profiles produced in the example of FIG. 13 are the same as those in FIG. 12 but in this fourth application also various temperature profiles can be generated by application of appropriate voltages to the terminals A-E of the heater track.

In the example of FIG. 13 also the outermost measurement electrodes (situated at the left and right in FIG. 13) are at the same temperature. However, unlike the third application, in the fourth application different bias voltages Vbias1 and Vbias2 are applied to these outermost measurement electrodes. Thus, this fourth application makes it possible to generate two measurements at the same temperature but using measurement electrodes applied with different bias voltages, increasing the data points available for characterizing the gas sample under test.

The embodiments and applications described above may be usefully applied to chemoresistor type gas sensors. However, the invention is applicable in general to gas sensors in which a gas-sensing element is heated during operation and the reaction of the gas-sensing element to gas species varies with operating temperature.

Configurable gas sensors according to embodiments of the invention have various advantages including the following. Thanks to the presence of the inner terminals, the heater track can be partially heated. The partial heating of the heater track enables better and wide thermal profiles to be created on the sensing material. By using plural electrodes disposed at locations where the temperature profile produces different temperatures, it is possible simultaneously to extract sensing signals which are acquired at different operating temperature. Byproducts and contaminants produced on the sensing materials after reaction with reactive gases can be removed using the partial heating.

Although the present invention has been described above with reference to particular embodiments, the skilled person will readily understand that the present invention is not limited by the details of the above-described embodiments. More particularly, the skilled person will understand that various modifications and developments can be made in the above-described embodiments and that different embodiments can be designed without departing from the present invention as defined in the appended claims.

Therefore, for example, although FIG. 7 illustrates a case in which a measurement electrode is provided in each bend of a heater track of meandering shape, it is not essential to provide a measurement electrode in every bend of such a heater track.

The present document refers to the heating element being "configurable" to set a temperature profile produced by the heating track and refers to the gas sensor comprising a control unit to configure the heating element by controlling the pattern of electric potentials applied to the inner and outer electric terminals of the heater track during use. The reader will understand that the "configurable" character of the heating element relates to the fact that the temperature profile produced by the heater track can be set and changed by the control unit. This contrasts with prior art heater tracks which are designed to be driven by voltages which correspond to a single, pre-programmed heating profile, albeit a profile which (in some cases) can be scaled up or scaled down by changing the magnitude of a voltage applied to the outer terminals of the track. Thus, as described above, according to embodiments of the invention the control unit may be designed to produce different temperature profiles by applying power to different sub-sets of the inner and outer terminals of the heater track.

The invention claimed is:

1. A gas sensor, comprising:
   a gas-sensitive layer; and
   a heating element to heat the gas-sensitive layer, the heating element comprising a heater track having first and second outer electric terminals and having at least one inner electric terminal located between the first and second outer electric terminals;
   wherein:
   the heating element is configurable in terms of a pattern of temperatures produced along the heater track, being designed to produce different profiles along the heater track upon application of respective different patterns of electric potentials to the at least one inner electric terminal and the first and second outer electric terminals; and
   a control unit is provided to control which of the different patterns of electric potentials is applied to the at least one inner electric terminal and the first and second outer electric terminals of the heater track during use, the different patterns of electrical potentials being defined by respective different control profiles applied by the control unit.

2. The gas sensor according to claim 1, wherein:
   the control unit is configured to select a pattern of electric potentials for application to the at least one inner electric terminal and the first and second outer electric terminals of the heater track which, when applied, heat the gas-sensitive layer to a predetermined target temperature.

3. A The gas sensor according to claim 2, wherein the control unit is configured:

to select, from among the at least one inner electric terminal and the first and second outer electric terminals, a pair of terminals between which to apply power, and to select, as said pair of terminals, two terminals which, when power is applied therebetween, heat the gas-sensitive layer to a temperature having a deviation from the predetermined target temperature which is the smallest out of deviations produced when power is applied between different possible pairs of terminals.

4. The gas sensor according to claim 3, wherein the control unit is configured to select said pair of terminals dependent on test data, said test data comprising information indicative of a temperature that is reached by the gas-sensitive layer when power is applied between two candidate terminals chosen from among the first and second outer electric terminals and the at least one inner electric terminals.

5. The gas sensor according to claim 1, wherein the control unit is configured to select a pattern of electric potentials which, when applied to the at least one inner electric terminal and the first and second outer electric terminals of the heater track, produce a temperature profile along the heater track, said temperature profile comprising regions at different temperatures.

6. The gas sensor according to claim 5, comprising plural measurement electrodes to measure an electrical characteristic of the gas-sensitive layer at different locations,
wherein the control unit is configured to select a pattern of potentials which, when applied to the at least one inner electric terminal and the first and second outer electric terminals of the heater track, produce a temperature profile having different-temperature regions coinciding, respectively, with said different locations where the plural measurement electrodes take measurements.

7. A The gas sensor according to claim 6, wherein:
the heater track has a meandering shape comprising plural bends and the at least one inner electric terminal is located on an outer side of the plural bends in the heater track; and
plural measurement electrodes are disposed inside bends of the heater track.

8. The gas sensor according to claim 1, comprising plural measurement electrodes to measure an electrical characteristic of the gas-sensitive layer at different locations,
wherein the control unit is configured to select a pattern of potentials which, when applied to the at least one inner electric terminal and the first and second outer electric terminals of the heater track, produce a temperature profile having regions at the same temperature coinciding, respectively, with said different locations where the plural measurement electrodes take measurements.

9. The gas sensor according to claim 8, and comprising a biasing unit configured to apply bias voltages to the plural measurement electrodes,
wherein the biasing unit is configured to apply different bias voltages to measurement electrodes taking measurements in regions at the same temperature.

10. The gas sensor according to claim 1, wherein the control unit is configured to clean a selected part of a length of the heater track by applying power between an inner electric terminal of the heater track and another electric terminal of the heater track, the selected part of the length of the heater track being the part between the inner electric terminal and the other electric terminal.

11. The gas sensor according to claim 1, wherein the control unit is driven by a set of control inputs, the set of control inputs being configured to determine voltages produced at a set of control outputs of the control unit;
wherein the set of control inputs specify values for voltage control outputs and durations during which the voltages are produced at the set of control outputs.

12. A method of calibrating a gas sensor comprising a gas-sensitive layer, a heating element to heat the gas-sensitive layer, the heating element comprising a heater track having first and second outer electric terminals and at least one inner electric terminal located between the first and second outer electric terminals, and the heating element being configurable in terms of a pattern of temperatures produced along the heater track, the heating element further being designed to produce different temperature profiles along the heater track profiles along the heater track upon application of respective different patterns of electric potentials to the at least one inner electric terminal and the first and second outer electric terminals, and a control unit to control which of the different patterns of electric potentials is applied to the at least one inner electrical terminal and the first and second outer electric terminals of the heater track during use, the different patterns of electric potentials being defined by respective different control profiles by the control unit, the method comprising:
applying power between a pair of candidate electric terminals selected among the at least one inner electric terminal and the first and second outer electric terminals of the heater track;
determining the temperature attained by the gas-sensitive layer when power is applied between the candidate electric terminals;
comparing the determined temperature with a predetermined target temperature; and
calibrating the control unit, based on a result of the comparing, to select a pair of terminals between which to apply power to heat the gas-sensitive layer to the predetermined target temperature.

13. The method according to claim 12, wherein the control unit further comprises a memory for storing different control profiles, the method further comprising the step of:
storing the different control profiles in the memory of the control unit.

14. A method of operating a gas sensor comprising a gas-sensitive layer, a heating element to heat the gas-sensitive layer, the heating element comprising a heater track having first and second outer electric terminals and at least one inner electric terminal located between the first and second outer electric terminals and the heating element being configurable in terms of a pattern of temperatures produced along the heater track, the heating element further being designed to produce different temperature profiles along the heater track profiles along the heater track upon application of respective different patterns of electric potentials to the at least one inner electric terminal and the first and second outer electric terminals, a control unit to control which of the different patterns of electric potentials is applied to the at least one inner electric terminal and the first and second outer electric terminals of the heater track during use, the different patterns of electric potentials being defined by respective different control profiles applied by the control unit, and plural measurement electrodes disposed at different locations relative to electric terminals of the heater track, the method comprising:
controlling, by the control unit, in accordance with a respective control profile, which of said different patterns of electric potentials is applied to the at least one inner electric terminal and the first and second outer electric terminals of the heater track, to produce along the heater track a temperature profile heating different ones of said plural measurement electrodes to different temperatures; and determining electrical characteristics of the gas-sensitive layer at said different temperatures by measuring a set of signals produced by said different ones of the plural measurement electrodes during heating of the plural measurement electrodes by said temperature profile.

\* \* \* \* \*